United States Patent
Freeman et al.

(10) Patent No.: US 12,031,443 B2
(45) Date of Patent: Jul. 9, 2024

(54) CERAMIC MATRIX COMPOSITE BLADE TRACK SEGMENT WITH ATTACHMENT FLANGE COOLING CHAMBERS

(71) Applicant: Rolls-Royce Corporation, Indianapolis, IN (US)

(72) Inventors: Ted J. Freeman, Danville, IN (US); Aaron D. Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/071,182

(22) Filed: Nov. 29, 2022

(65) Prior Publication Data

US 2024/0175371 A1 May 30, 2024

(51) Int. Cl.
*F01D 11/08* (2006.01)
*F01D 9/06* (2006.01)
*F01D 25/24* (2006.01)

(52) U.S. Cl.
CPC ............ *F01D 11/08* (2013.01); *F01D 9/06* (2013.01); *F01D 25/246* (2013.01); F05D 2240/14 (2013.01); F05D 2260/201 (2013.01); F05D 2300/6033 (2013.01)

(58) Field of Classification Search
CPC .......... F01D 8/11; F01D 25/24; F01D 25/243; F01D 25/246; F01D 11/08; F01D 9/06; F05D 2240/11; F05D 2240/14; F05D 2300/6033; F05D 2260/201
See application file for complete search history.

(56) References Cited

U.S. PATENT DOCUMENTS

| | | |
|---|---|---|
| 3,066,911 A | 12/1962 | Anderson et al. |
| 3,807,891 A | 4/1974 | McDow et al. |
| 3,880,435 A | 4/1975 | Thornbald |
| 4,676,715 A | 6/1987 | Imbault et al. |
| 4,863,345 A | 9/1989 | Thompson et al. |
| 5,080,557 A | 1/1992 | Berger |
| 5,116,199 A | 5/1992 | Ciokajlo |
| 5,203,673 A | 4/1993 | Evans |
| 5,295,787 A | 3/1994 | Leonard et al. |
| 5,459,995 A | 10/1995 | Norton et al. |
| 5,584,651 A | 12/1996 | Pietraszkiewicz et al. |
| 5,593,276 A | 1/1997 | Proctor et al. |
| 5,609,469 A | 3/1997 | Worley et al. |
| 6,142,731 A | 11/2000 | Dewis et al. |
| 6,821,085 B2 | 11/2004 | Darkins et al. |
| 6,877,952 B2 | 4/2005 | Wilson |
| 6,884,026 B2 | 4/2005 | Glynn et al. |
| 7,210,899 B2 | 5/2007 | Wilson, Jr. |

(Continued)

FOREIGN PATENT DOCUMENTS

FR 3056636 A1 3/2018

*Primary Examiner* — Brian P Wolcott
*Assistant Examiner* — Maxime M Adjagbe
(74) *Attorney, Agent, or Firm* — Barnes & Thornburg LLP (57) ABSTRACT

A turbine shroud assembly for use with a gas turbine engine includes a blade track assembly and a carrier assembly. The blade track assembly includes a blade track segment made of ceramic matrix composite materials and arranged to define a portion of a path of the turbine shroud assembly. The carrier assembly includes a carrier segment made of metallic materials that supports the blade track segment to locate the blade track segment radially outward of the axis.

20 Claims, 4 Drawing Sheets

(56) References Cited

U.S. PATENT DOCUMENTS

| | | |
|---|---|---|
| 7,494,317 B2 | 2/2009 | Keller et al. |
| 7,534,086 B2 | 5/2009 | Mazzola et al. |
| 7,726,936 B2 | 6/2010 | Keller et al. |
| 7,753,643 B2 | 7/2010 | Gonzalez et al. |
| 8,128,350 B2 | 3/2012 | Schiavo et al. |
| 8,388,309 B2 | 3/2013 | Marra et al. |
| 8,790,067 B2 | 7/2014 | Mccaffrey et al. |
| 8,905,709 B2 | 12/2014 | Dziech et al. |
| 8,944,756 B2 | 2/2015 | Lagueux |
| 8,979,489 B2 | 3/2015 | Taillant et al. |
| 9,587,504 B2 | 3/2017 | Mccaffrey et al. |
| 9,587,517 B2 | 3/2017 | Vetters et al. |
| 9,863,265 B2 | 1/2018 | Stapleton |
| 9,874,104 B2 | 1/2018 | Shapiro |
| 10,024,193 B2 | 7/2018 | Shapiro |
| 10,030,541 B2 | 7/2018 | Vetters et al. |
| 10,082,039 B2 | 9/2018 | Hanson |
| 10,132,197 B2 | 11/2018 | Heitman et al. |
| 10,174,628 B2 | 1/2019 | Humhauser et al. |
| 10,221,715 B2 * | 3/2019 | Varney .................. F01D 25/12 |
| 10,301,960 B2 | 5/2019 | Stapleton et al. |
| 10,370,991 B2 | 8/2019 | Wilson et al. |
| 10,378,385 B2 | 8/2019 | Tesson et al. |
| 10,378,386 B2 | 8/2019 | Roussille et al. |
| 10,415,426 B2 | 9/2019 | Quennehen et al. |
| 10,415,427 B2 | 9/2019 | Quennehen et al. |
| 10,422,241 B2 | 9/2019 | Mccaffrey et al. |
| 10,428,688 B2 | 10/2019 | Quennehen et al. |
| 10,577,963 B2 | 3/2020 | Mccaffrey |
| 10,590,803 B2 | 3/2020 | Quennehen et al. |
| 10,598,045 B2 | 3/2020 | Tableau et al. |
| 10,605,120 B2 | 3/2020 | Quennehen et al. |
| 10,619,517 B2 | 4/2020 | Quennehen et al. |
| 10,626,745 B2 | 4/2020 | Roussille et al. |
| 10,655,501 B2 | 5/2020 | Lepretre et al. |
| 10,689,998 B2 | 6/2020 | Stapleton et al. |
| 10,690,007 B2 | 6/2020 | Quennehen et al. |
| 10,724,399 B2 | 7/2020 | Carlin et al. |
| 10,753,221 B2 | 8/2020 | Barker et al. |
| 10,787,924 B2 | 9/2020 | Quennehen et al. |
| 10,815,810 B2 | 10/2020 | Barker et al. |
| 10,907,487 B2 | 2/2021 | Zurmehly et al. |
| 10,907,501 B2 | 2/2021 | Filippi et al. |
| 10,934,872 B2 | 3/2021 | Tableau et al. |
| 10,968,761 B2 | 4/2021 | Barker et al. |
| 11,015,613 B2 | 5/2021 | Kems et al. |
| 11,021,988 B2 | 6/2021 | Tableau et al. |
| 11,021,990 B2 | 6/2021 | Filippi |
| 11,028,720 B2 | 6/2021 | Tableau et al. |
| 11,041,399 B2 | 6/2021 | Lutjen et al. |
| 11,047,245 B2 | 6/2021 | Mccaffrey |
| 11,078,804 B2 | 8/2021 | Tableau et al. |
| 11,085,316 B2 | 8/2021 | Barker et al. |
| 11,085,317 B2 | 8/2021 | Johnson et al. |
| 11,111,822 B2 | 9/2021 | Tableau et al. |
| 11,111,823 B2 | 9/2021 | Jarrossay et al. |
| 11,143,050 B2 | 10/2021 | Roy Thill et al. |
| 11,174,747 B2 | 11/2021 | Roy Thill et al. |
| 11,174,795 B2 | 11/2021 | Lutjen et al. |
| 11,215,064 B2 | 1/2022 | Arbona et al. |
| 11,215,081 B2 | 1/2022 | Schilling et al. |
| 11,255,209 B2 | 2/2022 | Clark et al. |
| 11,326,470 B2 | 5/2022 | Dyson et al. |
| 11,365,635 B2 | 6/2022 | Read et al. |
| 11,441,434 B2 | 9/2022 | Danis et al. |
| 11,466,585 B2 | 10/2022 | Arbona et al. |
| 2009/0208284 A1 | 8/2009 | Funnell |
| 2016/0186611 A1 | 6/2016 | Vetters et al. |
| 2016/0186999 A1 | 6/2016 | Freeman et al. |
| 2016/0319688 A1 | 11/2016 | Thibault et al. |
| 2016/0333715 A1 | 11/2016 | Mccaffrey |
| 2017/0268366 A1 | 9/2017 | Mccaffrey et al. |
| 2018/0023408 A1 * | 1/2018 | Rice .................. F01D 11/08 415/173.1 |
| 2018/0051581 A1 | 2/2018 | Quennehen et al. |
| 2018/0051591 A1 | 2/2018 | Quennehen et al. |
| 2018/0073398 A1 | 3/2018 | Quennehen et al. |
| 2018/0080343 A1 | 3/2018 | Groleau et al. |
| 2018/0156069 A1 | 6/2018 | Quennehen et al. |
| 2018/0291769 A1 | 10/2018 | Vetters et al. |
| 2018/0355761 A1 | 12/2018 | Maar |
| 2019/0040758 A1 | 2/2019 | Quennehen et al. |
| 2019/0040761 A1 | 2/2019 | Carlin et al. |
| 2019/0084892 A1 | 3/2019 | Subramanian et al. |
| 2019/0101027 A1 | 4/2019 | Lepretre et al. |
| 2019/0128132 A1 | 5/2019 | Tableau et al. |
| 2020/0003076 A1 * | 1/2020 | Feldmann ............. F01D 11/003 |
| 2021/0131300 A1 | 5/2021 | Arbona et al. |
| 2021/0189909 A1 * | 6/2021 | Sippel .................. F01D 11/08 |
| 2022/0003126 A1 | 1/2022 | Roy Thill et al. |
| 2022/0056809 A1 | 2/2022 | Hock et al. |
| 2022/0120198 A1 | 4/2022 | Schilling et al. |

* cited by examiner

CERAMIC MATRIX COMPOSITE BLADE TRACK SEGMENT WITH ATTACHMENT FLANGE COOLING CHAMBERS

FIELD OF THE DISCLOSURE

The present disclosure relates generally to gas turbine engines, and more specifically to turbine shrouds adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional arrangements may not allow for the differing levels of expansion and contraction during operation of the gas turbine engine.

SUMMARY

The present disclosure may comprise one or more of the following features and combinations thereof.

A turbine shroud assembly for use with a gas turbine engine may comprise a blade track assembly and a carrier assembly. The blade track assembly may include a blade track segment made of ceramic matrix composite materials and arranged circumferentially at least partway around an axis to define a portion of a path of the turbine shroud assembly. The carrier assembly may include a carrier segment made of metallic materials that supports the blade track segment to locate the blade track segment radially outward of the axis and arranged circumferentially at least partway around the axis.

In some embodiments, the blade track segment may have a shroud wall, a first attachment flange, and a second attachment flange. The shroud wall may extend circumferentially partway around the axis. The first attachment flange may extend radially outward from the shroud wall. The second attachment flange may extend radially outward from the should wall. The second attachment flange may be spaced apart axially from the first attachment flange.

In some embodiments, the carrier segment may have an outer wall, forward and aft walls, and an intermediate mount. The forward and aft walls may extend radially inward form the outer wall axially forward and aft of the first and second attachment flanges. The intermediate mount may extend radially inward form the outer wall axially between the forward and aft mount flanges of the blade track segment so that the first attachment flange is located in a forward space between the forward wall and the intermediate mount and the second attachment flange is located in an aft space between the intermediate mount and the aft wall.

In some embodiments, the intermediate mount may be formed to include a cooling chamber and impingement passageways. The cooling chamber may extend circumferentially partway about the axis. The impingement passageways may be in fluid communication with the cooling chamber such that cooling air conducted into the cooling chamber is directed toward the blade track segment to cool the blade track segment during operation of the gas turbine engine. The impingement passageways may direct the cooling air at the shroud wall and the first and second attachment flanges of the blade track segment.

In some embodiments, the first and second attachment flanges of the blade track segment may extend radially outward from a base near the shroud wall of the blade track segment to a radially outer end spaced apart radially from the base. The impingement passageways may direct the cooling air toward the base of each of the first and second attachment flanges of the blade track segment. The impingement passageways may be spaced apart circumferentially along a circumferential length of the turbine shroud assembly.

In some embodiments, the intermediate mount of the carrier segment may be formed to include a forward intermediate mount wall, a second intermediate mount wall, and an inner wall. The forward intermediate mount wall may extend radially inward from the outer wall of the carrier segment. The aft intermediate mount wall may extend radially inward from the outer wall of the carrier segment and may be spaced apart axially from the forward intermediate mount wall to define the cooling chamber therebetween. The inner wall may extend axially between radially inner ends of the forward and aft intermediate mount walls.

In some embodiments, the inner wall may be a separate piece. The inner wall may be brazed to the radially inner ends of the forward and aft intermediate mount walls.

In some embodiments, the carrier assembly may further include a pair of end walls. Each of the end walls in the pair of end walls may be coupled to a circumferential end of the carrier segment to close off the cooling chamber on either circumferential end of the carrier segment.

In some embodiments, the impingement passageways may be formed in the forward and aft intermediate mount walls of the intermediate mount. The outer wall may be formed to include a cooling passageway configured to conduct cooling air through the outer wall of the carrier segment into the cooling chamber.

In some embodiments, the impingement passageways may be formed in the inner wall of the intermediate mount. The outer wall may be formed to include a cooling passageway configured to conduct cooling air through the outer wall of the carrier segment into the cooling chamber.

In some embodiments, the turbine shroud assembly may further comprise a first mount pin. The first mount pin may extend into the first attachment flange of the blade track segment, through the intermediate mount of the carrier segment, and into the second attachment flange of the blade track segment to couple the blade track segment to the carrier segment such that the cooling air in the cooling chamber cools the first mount pin.

In some embodiments, the outer wall may be formed to include a cooling passageway configured to conduct cooling air through the outer wall of the carrier segment into the cooling chamber. The cooling passageway may be circumferentially aligned with the first mount pin such that cooling air conducted through the outer wall into the cooling chamber is directed at the first mount pin.

According to another aspect of the present disclosure, a turbine shroud assembly for use with a gas turbine engine may comprise a blade track assembly and a carrier assembly. The blade track assembly may include a blade track segment arranged circumferentially at least partway around an axis. The carrier assembly may include a carrier segment arranged circumferentially at least partway around the axis that supports the blade track segment.

In some embodiments, the blade track segment may include a shroud wall, a first attachment flange, and a second attachment flange. The shroud wall may extend circumferentially partway around the axis. The first attachment flange may extend radially outward from the shroud wall. The second attachment flange may extend radially outward from the should wall. The second attachment flange may be spaced apart axially from the first attachment flange.

In some embodiments, the carrier segment may have an outer wall and an intermediate mount. The intermediate mount may extend radially inward from the outer wall axially between the first and second attachment flanges of the blade track segment axially between the first and second attachment flanges of the blade track segment.

In some embodiments, the intermediate mount may be formed to include a cooling chamber and at least one impingement passageway. The cooling chamber may extend circumferentially partway about the axis. The at least one impingement passageway may be in fluid communication with the cooling chamber such that cooling air conducted into the cooling chamber is directed toward the blade track segment.

In some embodiments, the first and second attachment flanges of the blade track segment may extend radially outward from a base near the shroud wall of the blade track segment to a radially outer end spaced apart radially from the base. The at least one impingement passageway may direct the cooling air toward the base of one of the first attachment flange and the second attachment flange of the blade track segment.

In some embodiments, the intermediate mount of the carrier segment may be formed to include a forward intermediate mount wall, an aft intermediate mount wall, and an inner wall. The forward intermediate mount wall may extend radially inward from the outer wall of the carrier segment. The aft intermediate mount wall may extend radially inward from the outer wall of the carrier segment and may be spaced apart axially from the forward intermediate mount wall to define the cooling chamber therebetween. The inner wall may extend axially between radially inner ends of the forward and aft intermediate mount walls.

In some embodiments, the inner wall may be a separate piece. The inner wall may be brazed to the radially inner ends of the forward and aft intermediate mount walls.

In some embodiments, the impingement passageways may be formed in the forward and aft intermediate mount walls of the intermediate mount. The outer wall may be formed to include a cooling passageway configured to conduct cooling air through the outer wall of the carrier segment into the cooling chamber.

In some embodiments, the carrier assembly may further include a pair of end walls. Each end wall of the pair of end walls may be coupled to a circumferential end of the carrier segment to close off the cooling chamber on either circumferential end of the carrier segment.

In some embodiments, the turbine shroud assembly may further comprise a first mount pin. The first mount pin may extend into the first attachment flange of the blade track segment, through the intermediate mount of the carrier segment, and into the second attachment flange of the blade track segment to couple the blade track segment to the carrier segment such that the cooling air in the cooling chamber cools the first mount pin.

According to another aspect of the present disclosure, a method may include providing a blade track segment and a carrier assembly. The blade track segment may be arranged circumferentially at least partway around an axis. The carrier assembly may include a carrier segment arranged circumferentially at least partway around the axis.

In some embodiments, the blade track segment may be formed to include a shroud wall, a first attachment flange, and a second attachment flange. The first attachment flange may extend radially outward from the shroud wall. The second attachment flange may extend radially outward from the should wall.

In some embodiments, the carrier segment may be formed to include an outer wall, first and second walls, and an intermediate mount. The first and second walls may each extend radially inward form the outer wall. The intermediate mount may extend radially inward form the outer wall axially between the first and second walls. The intermediate mount may be formed to include a cooling chamber and impingement passageways in fluid communication with the cooling chamber.

In some embodiments, the method may include arranging the blade track segment adjacent the carrier segment. The blade track segment may be arranged adjacent to the carrier segment so that the intermediate mount of the carrier segment is located axially between the first and second attachment flanges of the blade track segment.

In some embodiments, the method may include inserting a pin. The method may include inserting the pin into the first attachment flange of the blade track segment, through the intermediate mount of the carrier segment, and into the second attachment flange of the blade track segment to couple the blade track segment with the carrier segment.

In some embodiments, the method may include conducing a flow of cooling air to the cooling chamber formed in the intermediate mount of the carrier segment. The flow of cooling air may be conducted to the cooling chamber so that the impingement passageways direct the flow of cooling air toward the blade track segment to cool blade track segment. In some embodiments, the flow of cooling air may be conducted to the cooling chamber so that the impingement passageways direct the flow of cooling air toward the first and second attachment flanges of the blade track segment to cool the first and second attachment flanges.

In some embodiments, the intermediate mount of the carrier segment may be formed to include a forward intermediate mount wall, an aft intermediate mount wall, and an inner wall. The forward intermediate mount wall may extend radially inward from the outer wall of the carrier segment. The aft intermediate mount wall may extend radially inward from the outer wall of the carrier segment and may be spaced apart axially from the forward intermediate mount wall to define the cooling chamber therebetween. The inner wall may extend axially between radially inner ends of the forward and aft intermediate mount walls.

In some embodiments, the inner wall may be a separate piece. The method may further include brazing the inner wall to the radially inner ends of the forward and aft intermediate mount walls.

In some embodiments, the carrier assembly may further include a pair of end walls. Each end wall of the pair of end walls may be coupled to a circumferential end of the carrier segment to close off the cooling chamber on either circumferential end of the carrier segment.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
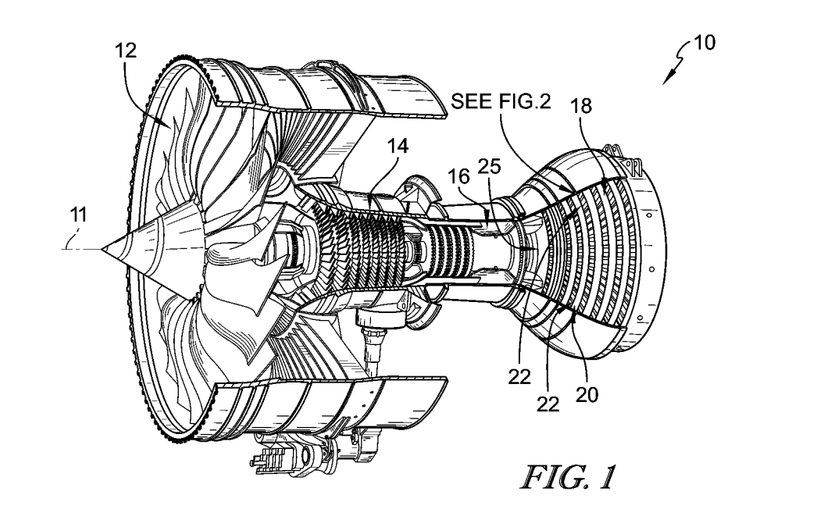
FIG. 1 is a cutaway perspective view of a gas turbine engine that includes a fan, a compressor, a combustor, and a turbine, the turbine includes a turbine shroud assembly that extended circumferentially around the axis and turbine wheels that are driven to rotate about an axis of the engine to generate power.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
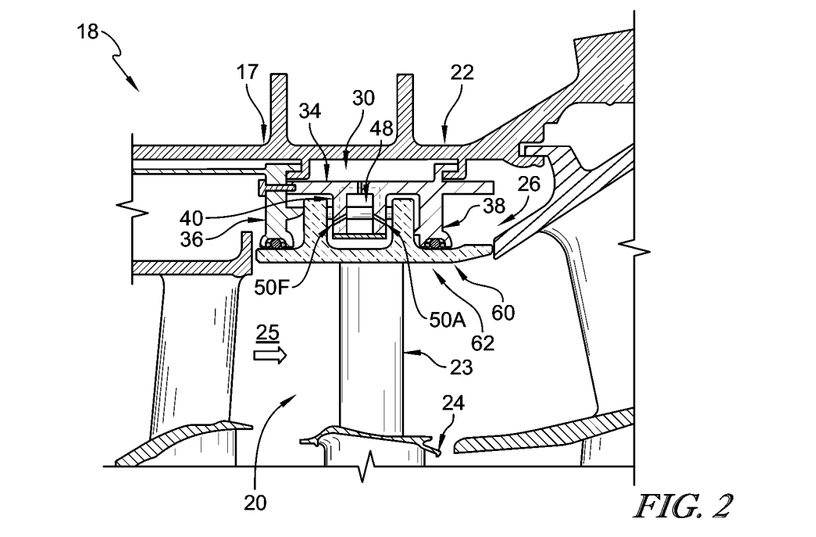
FIG. 2 is a cross-sectional view of a portion of the turbine included in the gas turbine engine of FIG. 1 showing one of the turbine wheel assemblies and the turbine shroud arranged around the turbine wheel assembly, the turbine shroud including a blade track assembly having a blade track segment and mount pins, a carrier segment assembly including a ceramic segment formed to define a cooling chamber located axially between attachment flanges of the blade track segment and a plurality of impingement passageways in fluid communication with the cooling chamber to direct cooling air at the blade track segment to cool the blade track segment during use of the gas turbine engine.

The turbine section 18 includes at least one turbine wheel assembly 20 and a turbine shroud 22 positioned to surround the turbine wheel assembly 20 as shown in FIGS. 1 and 2. The turbine wheel assembly 20 includes a plurality of blades 23 coupled to a rotor disk 24 for rotation with the disk 24. The hot, high pressure combustion products from the combustor 16 are directed toward the blades 23 of the turbine wheel assemblies 20 along a flow path 25. The turbine shroud 22 is coupled to an outer case 17 of the gas turbine engine 10 and extends around the turbine wheel assembly 20 to block gases from passing over the turbine blades 23 during use of the turbine section 18 in the gas turbine engine 10.

In the illustrative embodiment, the turbine shroud 22 is made up of a number of turbine shroud assemblies 26 that each extend circumferentially partway around the axis 11 and cooperate to surround the turbine wheel assembly 20. In other embodiments, the turbine shroud 22 is annular and non-segmented to extend fully around the central axis 11 and surround the turbine wheel assembly 20. In yet other embodiments, certain components of the turbine shroud 22 are segmented while other components are annular and non-segmented.

Figure 3:
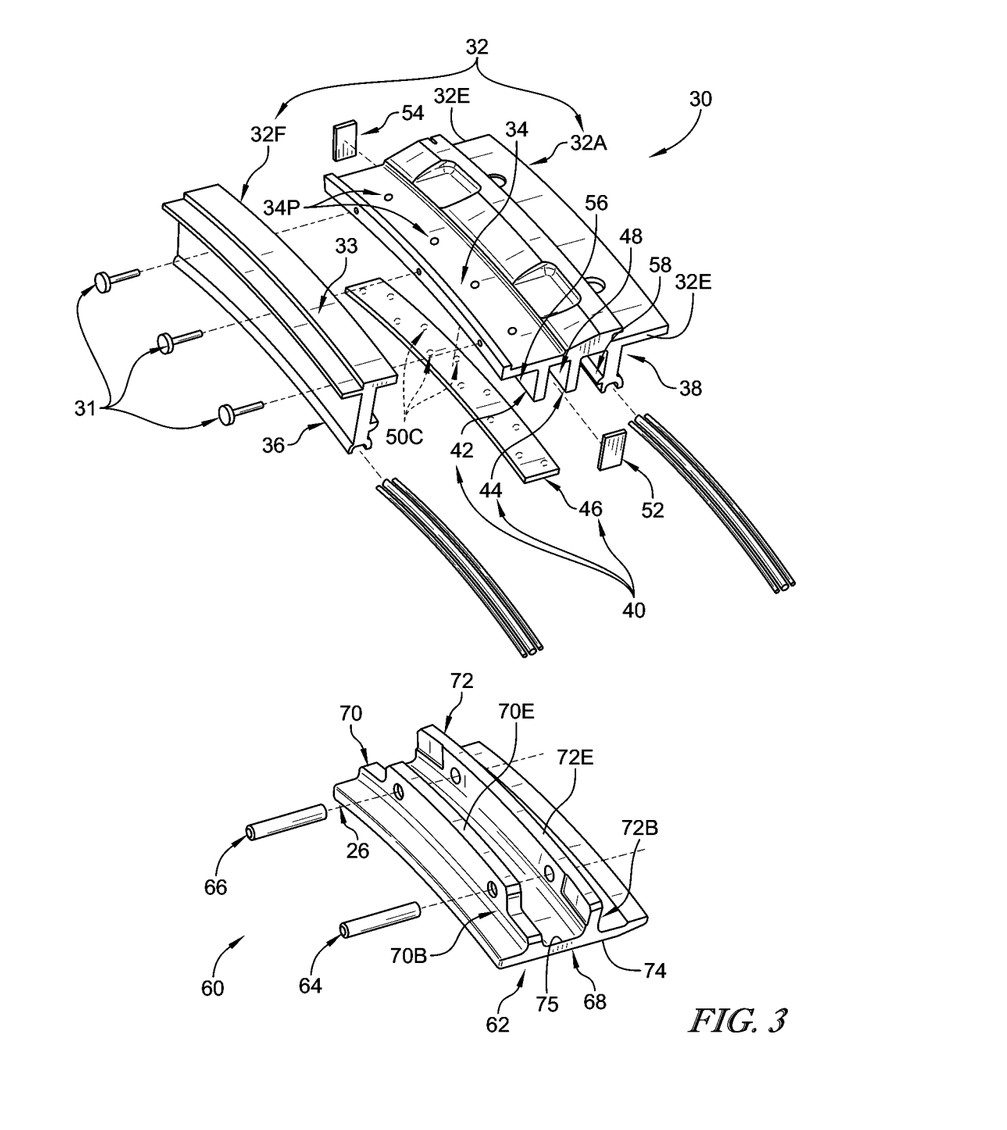
FIG. 3 is an exploded view of the turbine shroud of FIG. 2 showing, from top to bottom, the carrier assembly including the carrier segment having forward and aft carrier segments and a plurality of walls configured to be coupled to the carrier segment to define the cooling chamber, and the blade track assembly including the blade track segment having a shroud wall and the attachment flanges that extend radially outward from the shroud wall and mount pins configure to extend through the attachment flanges to couple the blade track segment to the carrier segment.
Figure 4:
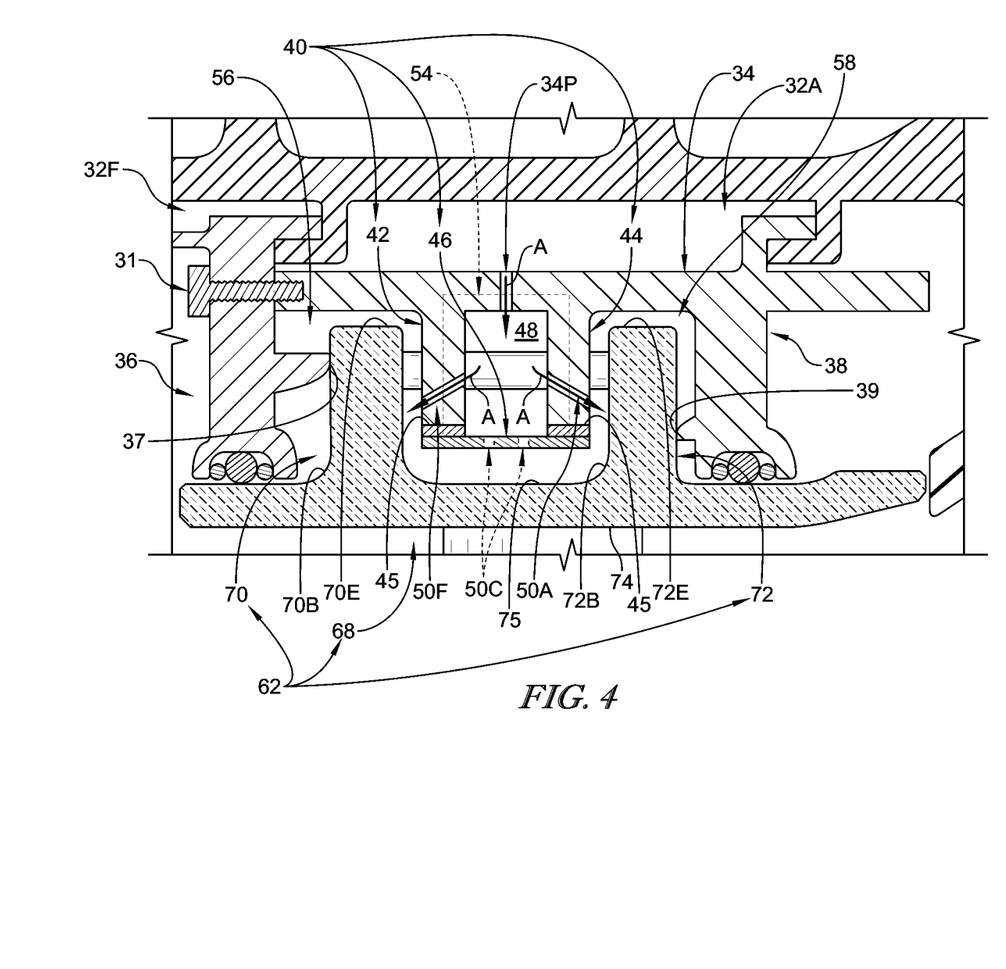
FIG. 4 is a detailed cross-section view of the turbine shroud of FIG. 2 showing the carrier segment has an intermediate mount that extends in between the attachment flanges of the blade track segment, the intermediate mount is formed to include the cooling chamber and the plurality of impingement passageways to direct the cooling air at the attachment flanges.

Each turbine shroud assembly 26 includes a carrier assembly 30 and a blade track assembly 60 supported by the carrier segment so that the blade track assembly 60 is located radially outward of the axis 11, as shown in FIGS. 2-4. The carrier assembly 30 includes a carrier segment 32 made of metallic materials and arranged circumferentially around the axis 11. The carrier segment 32 includes an outer wall 34 that extends circumferentially partway around the axis 11, forward and aft walls 36, 38, and an intermediate mount 40. The forward and aft walls 36, 38 that each extend radially inward from the outer wall 34 axially forward and aft of attachment flanges of a blade track segment 62 included in the blade track assembly 60. The intermediate mount 40 extends radially inward from the outer wall 34 in between the attachment flanges 70, 72 of the blade track segment 62.

The intermediate mount 40 is shaped to include a cooling chamber 48 and a plurality of impingement passageways 50F, 50A as shown in FIGS. 2 and 4. The cooling chamber 48 extends circumferentially partway about the axis 11. The impingement passageways 50F, 50A are in fluid communication with the cooling chamber 48 such that cooling air, as suggested by arrow A, conducted into the cooling chamber 48 is directed toward the attachment flanges 70, 72 of the blade track segment 62 to cool the first and second attachment flanges 70, 72 during operation of the gas turbine engine 10.

During operation of the gas turbine engine 10, the hot, high-pressure products directed into the turbine 18 from the combustor 16 flow across a shroud wall 68 of the blade track segment 62 that defines a portion of the flow path 25. The hot gases flowing across the shroud wall 68 heat the blade track segment 62. Therefore, the attachment flanges 70, 72 act as heat sinks, transferring heat from the gas path 25 to the mount pins 64, 66 that couple the blade track segment 62 to the carrier segment 32. The pins 64, 66 are made of metallic materials and therefore the added heat may challenge the life of the pins 64, 66.

To prevent the attachment flanges 70, 72 from acting as heat sinks and transferring heat to the mount pins 64, 66, the carrier segment 32 is formed to include the cooling chamber 48 and the impingement passageways 50F, 50A. The cooling air A conducted into the cooling chamber 48 is directed toward the attachment flanges 70, 72 of the blade track segment 62 by the impingement passageways 50F, 50A to cool the first and second attachment flanges 70, 72 during operation of the gas turbine engine 10. This prevents the heat from traveling up the attachment flanges 70, 72 to the mount pins 64, 66.

The intermediate mount 40 is formed to include a forward intermediate mount wall 42, an aft intermediate mount wall 44, and an inner wall 46 as shown in FIG. 4. The forward and aft intermediate mount walls 42, 44 each extend radially inward from the outer wall 34 of the carrier segment 32. The aft intermediate mount wall 44 is spaced apart axially from the forward intermediate mount wall 42 to define the cooling chamber 48 therebetween as shown in FIG. 4. The inner wall 46 extends axially between the forward and aft intermediate mount walls 42, 44 to form a radially inner end of the intermediate mount 40.

In the illustrative embodiment, the inner wall 46 is a separate piece from the carrier segment 32 and is coupled to the radially inner ends 42E, 44E of the forward and aft intermediate mount walls 42, 44 as shown in FIGS. 3 and 4. The inner wall 46 may be coupled to the radially inner ends 42E, 44E of the forward and aft intermediate mount walls 42, 44 by a braze layer 45 or a weld 45.

The impingement passageways 50F, 50A are formed in each of the forward and aft mount flanges 42, 44 of the intermediate mount 40 as shown in FIG. 4. The impingement passageways 50F, 50A extend radially and axially at an angle through the corresponding mount flange 42, 44. The impingement passageways 50F, 50A are spaced apart circumferentially along a circumferential length of the carrier segment 32.

In some embodiments, the inner wall 46 may be formed to include impingement passageways 50C as suggested in FIGS. 3 and 4. The impingement passageways 50C may direct the flow of cooling air from the cooling chamber 48 at a radially outer surface 75 of the shroud wall 68 of the blade track segment 62. The impingement passageways 50C may be spaced apart circumferentially along a circumferential length of the inner wall 46 as suggested in FIG. 3.

In some embodiments, the cooling chamber 48 of each turbine shroud assembly 26 may be in fluid communication with the cooling chamber 48 of each adjacent turbine shroud assembly 26. In embodiments, the turbine shroud assemblies 26 includes seals to seal between adjacent turbine shroud assembles 26.

Figure 5:
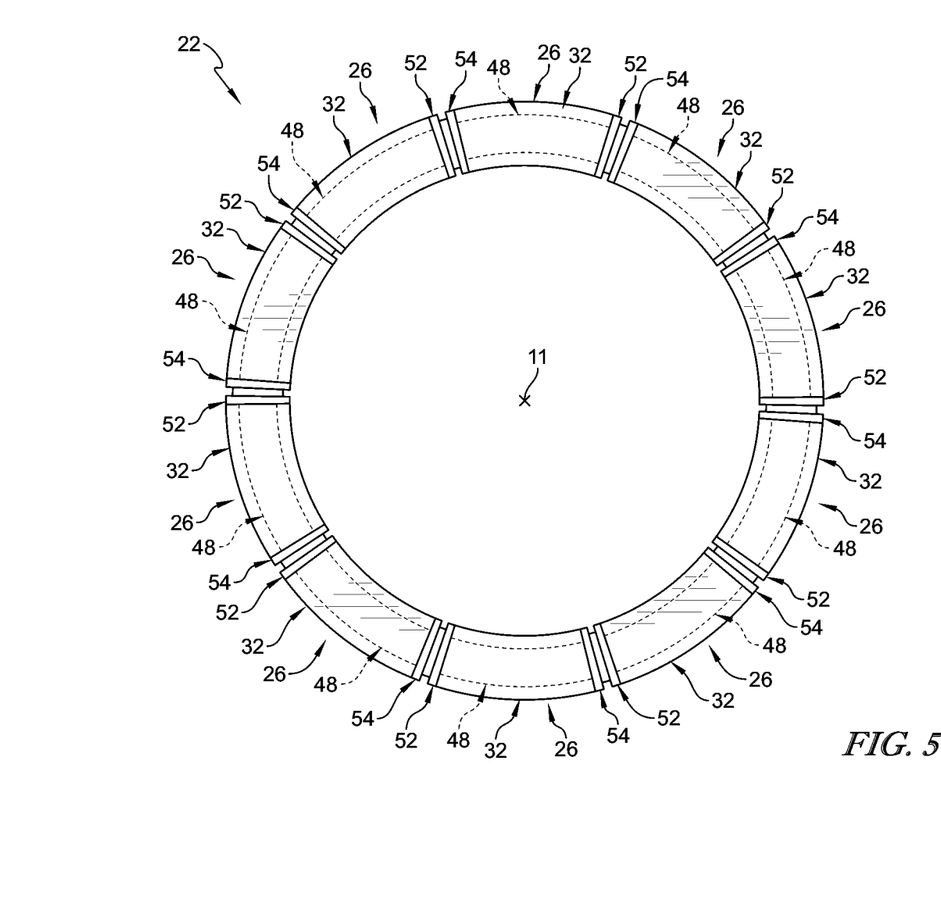
FIG. 5 is an axial view of the turbine shroud included in the turbine of the gas turbine engine of FIG. 1 showing the turbine shroud is made up of a number of turbine shroud assemblies that each extend circumferentially partway around the axis of the gas turbine engine and each turbine shroud assembly includes a cooling chamber.

In the illustrative embodiment, the carrier assembly 30 of each turbine shroud assembly 26 further includes a pair of end walls 52, 54 as shown in FIGS. 3 and 5. The pair of end walls 52, 54 are coupled to circumferential ends 32E of the carrier segment 32 to close off the cooling chamber 48 on either circumferential end 32E of the carrier segment 32. In this way, the cooling chamber 48 of each turbine shroud assembly 26 is separate from the other cooling chambers 48 of each adjacent turbine shroud assembly 26.

Turning again to the blade track assembly 60, the blade track assembly 60 of the turbine shroud assembly 26 includes the blade track segment 62 and the mount pins 64, 66, as shown in FIGS. 2 and 3. The blade track segment 62 is made of ceramic matrix composite materials and extends circumferentially partway around the axis 11. The blade track segment 62 is supported by the carrier segment 32 to locate the blade track segment 62 radially outward of the axis 11 and define a portion of the flow path 25.

The blade track segment 62 includes the shroud wall 68 and the attachment flange 70, 72, as shown in FIGS. 2-4. The shroud wall 68 is arcuate and extends circumferential partway around the axis 11 and extends a limited axial distance across the axis 11. The shroud wall 68 includes a radially inner surface 74 that faces the flow path 25, and the radially outer surface 75 that faces outwardly towards the carrier assembly 30. The inner surface 74 cooperates with the turbine wheel assembly 20 to block hot gases in the flow path 25 from passing over the top of the turbine wheel assembly 20.

Each attachment flange 70, 72 extends radially outward from the outer surface 75 of the shroud wall 68, as shown in FIGS. 2-4. The first attachment flange 70 extends radially outward from the shroud wall 68 into a forward space 56 between the forward wall 36 and the intermediate mount 40. The second attachment flange 72 extends radially outward from the shroud wall 68 into an aft space 58 between the intermediate mount 40 and the aft wall 38.

In the illustrative embodiment, each attachment flange 70, 72 extends radially outward from the shroud wall 68 from a base 70B, 72B to a radially outer terminal end 70E, 72E as shown in FIGS. 3 and 4. The base 70B, 72B is located near the outer surface 75 of the shroud wall 68. The radially outer end 70E, 72E is spaced apart radially from the base 70B, 72B.

The intermediate mount 40 is located axially in between the first attachment flange 70 and the second attachment flange 72 as shown in FIG. 4. In the illustrative embodiment, the impingement passageways 50F, 50A direct the cooling air A toward the base 70, 72B of each of the first and second attachment flanges 70, 72 of the blade track segment 62. This cools the attachment flanges 70, 72 at the base 70B, 72B and prevents the heat from reaching the mount pins 64, 66.

The carrier assembly 30 includes the carrier segment 32 and the end walls 52, 54 as shown in FIG. 3. In the illustrative embodiment, the carrier segment 32 includes radially outward extending flanges 33, 35 that are radially aligned with each other and couple to the outer case 17.

In the illustrative embodiment, the carrier segment 32 includes a fore carrier segment 32F and an aft carrier segment 32A configured to be coupled to the fore carrier segment 32F as shown in FIG. 3. The fore carrier segment 32F and the aft carrier segment 32A cooperate to form the outer wall 34. The fore carrier segment 32F includes the forward wall 36 that extends radially inward from a forward portion of the outer wall 34. The aft carrier segment 32A includes the aft wall 38 and the intermediate mount 40 that extend radially inward from an aft portion of the outer wall 34. The fore carrier segment 32F is coupled to the aft carrier segment 32A with fasteners 31.

The forward wall 36 includes an engagement lip 37 that extends axially away from the radially-extending portion of the forward wall 36. The engagement lip 37 that extends axially aft from the forward wall 36 and engages the first attachment flange 70 of the blade track segment 62. The engagement lip 37, in addition to extending axially away from the forward wall 36, also extends circumferentially along the circumferential extent of the forward wall 36 so as to seal off gases flowing along the flow path 25 radially within the blade track assembly 60.

The aft wall 38 includes a chordal seal 37 that extends axially away from the radially-extending portion of the aft wall 38. The chordal seal 37 extends axially forward away from the radially-extending portion of the aft wall 38 and engages the second attachment flange 72. The chordal seal 39, in addition to extending axially away from the aft wall 38, also extends circumferentially along the circumferential extent of the aft wall 38 so as to seal off gases flowing along the flow path 25 radially within the blade track assembly 60.

In the illustrative embodiment, the outer wall 34 of the carrier segment 32 is formed to include at least one cooling passageway 34P as shown in FIGS. 3 and 4. The cooling passageway 34P is configured to conduct cooling air through the outer wall 34 of the carrier segment 32 into the cooling chamber 48. In the illustrative embodiment, the outer wall 34 is formed to include a plurality of cooling passageways 34P that are spaced apart circumferentially along the carrier segment 32. In some embodiments, the cooling passageways 34P may be circumferentially aligned with the mount pins 64, 66 such that cooling air conducted through the outer wall 34 into the cooling chamber 48 is directed at the pins 64, 66.

The intermediate mount 40 is shaped to include the cooling chamber 48 and the plurality of impingement passageways 50F, 50A as shown in FIGS. 2 and 4. The cooling chamber 48 extends circumferentially partway about the axis 11. The impingement passageways 50F, 50A are in fluid communication with the cooling chamber 48 such that cooling air A conducted into the cooling chamber 48 is directed toward the attachment flanges 70, 72 of the blade track segment 62 to cool the first and second attachment flanges 70, 72 during operation of the gas turbine engine 10.

The intermediate mount 40 is formed to include the forward intermediate mount wall 42, the aft intermediate mount wall 44, and the inner wall 46 as shown in FIG. 4. The forward and aft intermediate mount walls 42, 44 each extend radially inward from the outer wall 34 of the carrier segment 32. The aft intermediate mount wall 44 is spaced apart axially from the forward intermediate mount wall 42 to define the cooling chamber 48 therebetween as shown in FIG. 4. The inner wall 46 extends axially between the forward and aft intermediate mount walls 42, 44 to form a radially inner end of the intermediate mount 40.

In the illustrative embodiment, the inner wall 46 is a separate piece from the carrier segment 32 and is coupled to the radially inner ends 42E, 44E of the forward and aft intermediate mount walls 42, 44 as shown in FIGS. 3 and 4. The inner wall 46 may be coupled to the radially inner ends 42E, 44E of the forward and aft intermediate mount walls 42, 44 by a braze layer 45 or a weld 45.

The impingement passageways 50F, 50A are formed in each of the forward and aft mount flanges 42, 44 of the intermediate mount 40 as shown in FIG. 4. The impingement passageways 50F, 50A extend radially and axially at an angle through the corresponding mount flange 42, 44. The impingement passageways 50F, 50A are spaced apart circumferentially along a circumferential length of the carrier segment 32.

A method for assembly and using the turbine shroud assembly 26 in the gas turbine engine 10 may include several steps. The method may begin by arranging the blade track segment 62 adjacent the carrier segment 32 so that the intermediate mount 40 of the carrier segment 32 is located axially between the first and second attachment flanges 70, 72 of the blade track segment 62. In this way, the impingement passageways 50F, 50A are directed at the attachment flanges 70, 72.

Then, the pins 64, 66 are inserted into the carrier segment 32 through the blade track segment 62 to couple the blade track segment 62 with the carrier segment 32. In the illustrative embodiment, the pins 64, 66 are inserted into the first attachment flange 70 of the blade track segment 62, through the intermediate mount 40 of the carrier segment 32, and into the second attachment flange 72 of the blade track segment 62.

Once the pins 64, 66 are inserted and the turbine shroud assembly 26 is arranged in the gas turbine engine 10, the method includes conducing the flow of cooling air, as suggested by arrow A, to the cooling chamber 48 formed in the intermediate mount 40 of the carrier segment 32. The flow of cooling air A is conducted to the cooling chamber 48 so that the impingement passageways 50F, 50A direct the flow of cooling air A toward the first and second attachment flanges 70, 72 of the blade track segment 62 to cool the first and second attachment flanges 70, 72 during operation of the gas turbine engine 10.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising
   a blade track assembly including a blade track segment made of ceramic matrix composite materials and arranged circumferentially at least partway around an axis to define a portion of a path of the turbine shroud assembly, the blade track segment having a shroud wall that extends circumferentially partway around the axis, a first attachment flange that extends radially outward from the shroud wall, and a second attachment flange that extends radially outward from the should wall, the second attachment flange spaced apart axially from the first attachment flange, and
   a carrier assembly including a carrier segment made of metallic materials that supports the blade track segment to locate the blade track segment radially outward of the axis and arranged circumferentially at least partway around the axis, the carrier segment having an outer wall, forward and aft walls that extend radially inward from the outer wall axially forward and aft of the first and second attachment flanges, and an intermediate mount that extends radially inward from the outer wall axially between the forward and aft mount flanges of the blade track segment so that the first attachment flange is located in a forward space between the forward wall and the intermediate mount and the second attachment flange is located in an aft space between the intermediate mount and the aft wall,
   wherein the intermediate mount is formed to include a cooling chamber that extends circumferentially partway about the axis and impingement passageways in fluid communication with the cooling chamber such that cooling air conducted into the cooling chamber is directed toward the blade track segment to cool the blade track segment during operation of the gas turbine engine, and wherein at least one of the impingement passageways directs the cooling air axially forward toward the first attachment flange and at least one of the impingement passageways directs the cooling air axially aft toward the second attachment flange.

2. The turbine shroud assembly of claim 1, wherein the first and second attachment flanges of the blade track segment extend radially outward from a base near the shroud wall of the blade track segment to a radially outer end spaced apart radially from the base, and wherein the impingement passageways direct the cooling air toward the base of each of the first and second attachment flanges of the blade track segment.

3. The turbine shroud assembly of claim 2, wherein the impingement passageways are spaced apart circumferentially along a circumferential length of the turbine shroud assembly.

4. The turbine shroud assembly of claim 1, wherein the intermediate mount of the carrier segment is formed to include a forward intermediate mount wall that extends radially inward from the outer wall of the carrier segment, an aft intermediate mount wall that extends radially inward from the outer wall of the carrier segment and spaced apart axially from the forward intermediate mount wall to define the cooling chamber therebetween, and an inner wall that extends axially between radially inner ends of the forward and aft intermediate mount walls.

5. The turbine shroud assembly of claim 4, wherein the inner wall is a separate piece and brazed to the radially inner ends of the forward and aft intermediate mount walls.

6. The turbine shroud assembly of claim 4, wherein at least one of the impingement passageways is formed in the forward intermediate mount wall of the intermediate mount and at least one of the impingement passageways is formed in the aft intermediate mount wall of the intermediate mount, and wherein the outer wall is formed to include a cooling passageway configured to conduct cooling air through the outer wall of the carrier segment into the cooling chamber.

7. The turbine shroud assembly of claim 4, wherein at least one of the impingement passageways is formed in the inner wall of the intermediate mount, and wherein the outer wall is formed to include a cooling passageway configured to conduct cooling air through the outer wall of the carrier segment into the cooling chamber.

8. The turbine shroud assembly of claim 1, wherein the carrier assembly further includes a pair of end walls that are each coupled to a circumferential end of the carrier segment to close off the cooling chamber on either circumferential end of the carrier segment.

9. The turbine shroud assembly of claim 8, further comprising a first mount pin that extends into the first attachment flange of the blade track segment, through the intermediate mount of the carrier segment, and into the second attachment flange of the blade track segment to couple the blade track segment to the carrier segment such that the cooling air in the cooling chamber cools the first mount pin, and wherein the outer wall is formed to include a cooling passageway configured to conduct cooling air through the outer wall of the carrier segment into the cooling chamber and the cooling passageway is circumferentially aligned with the first mount pin such that cooling air conducted through the outer wall into the cooling chamber is directed at the first mount pin.

10. A turbine shroud assembly for use with a gas turbine engine, the turbine shroud assembly comprising
a blade track assembly including a blade track segment arranged circumferentially at least partway around an axis, the blade track segment including a shroud wall that extends circumferentially partway around the axis, a first attachment flange that extends radially outward from the shroud wall, and a second attachment flange that extends radially outward from the should wall, the second attachment flange spaced apart axially from the first attachment flange, and
a carrier assembly including a carrier segment arranged circumferentially at least partway around the axis that supports the blade track segment, the carrier segment having an outer wall and an intermediate mount that extends radially inward from the outer wall axially between the first and second attachment flanges of the blade track segment axially between the first and second attachment flanges of the blade track segment,
wherein the intermediate mount is formed to include a cooling chamber that extends circumferentially partway about the axis and at least one impingement passageway in fluid communication with the cooling chamber such that cooling air conducted into the cooling chamber is directed toward the blade track segment, and
wherein at least one of the impingement passageways directs the cooling air toward the first attachment flange and at least one of the impingement passageways directs the cooling air toward the second attachment flange.

11. The turbine shroud assembly of claim 10, wherein the first and second attachment flanges of the blade track segment extend radially outward from a base near the shroud wall of the blade track segment to a radially outer end spaced apart radially from the base, and wherein the at least one impingement passageway directs the cooling air toward the base of one of the first attachment flange and the second attachment flange of the blade track segment.

12. The turbine shroud assembly of claim 10, wherein the intermediate mount of the carrier segment is formed to include a forward intermediate mount wall that extends radially inward from the outer wall of the carrier segment, an aft intermediate mount wall that extends radially inward from the outer wall of the carrier segment and spaced apart axially from the forward intermediate mount wall to define the cooling chamber therebetween, and an inner wall that extends axially between radially inner ends of the forward and aft intermediate mount walls.

13. The turbine shroud assembly of claim 12, wherein the inner wall is a separate piece and brazed to the radially inner ends of the forward and aft intermediate mount walls.

14. The turbine shroud assembly of claim 12, wherein at least one of the impingement passageways is formed in the forward intermediate mount wall of the intermediate mount and at least one of the impingement passageways is formed in the aft intermediate mount wall of the intermediate mount, and wherein the outer wall is formed to include a cooling passageway configured to conduct cooling air through the outer wall of the carrier segment into the cooling chamber.

15. The turbine shroud assembly of claim 10, wherein the carrier assembly further includes a pair of end walls that are each coupled to a circumferential end of the carrier segment to close off the cooling chamber on either circumferential end of the carrier segment.

16. The turbine shroud assembly of claim 10, further comprising a first mount pin that extends into the first attachment flange of the blade track segment, through the intermediate mount of the carrier segment, and into the second attachment flange of the blade track segment to couple the blade track segment to the carrier segment such that the cooling air in the cooling chamber cools the first mount pin.

17. A method comprising
providing a blade track segment arranged circumferentially at least partway around an axis, the blade track segment formed to include a shroud wall, a first attachment flange that extends radially outward from the shroud wall, and a second attachment flange that extends radially outward from the should wall,
providing a carrier assembly including a carrier segment arranged circumferentially at least partway around the axis, the carrier segment formed to include an outer wall, first and second walls that extend radially inward from the outer wall, and an intermediate mount that extends radially inward from the outer wall axially between the first and second walls, wherein the intermediate mount is formed to include a cooling chamber and impingement passageways in fluid communication with the cooling chamber,
arranging the blade track segment adjacent the carrier segment so that the intermediate mount of the carrier segment is located axially between the first and second attachment flanges of the blade track segment,
inserting a pin into the first attachment flange of the blade track segment, through the intermediate mount of the carrier segment, and into the second attachment flange of the blade track segment to couple the blade track segment with the carrier segment, and
conducing a flow of cooling air to the cooling chamber formed in the intermediate mount of the carrier segment so that at least one of the impingement passageways directs the flow of cooling air toward the first attachment flange of the blade track segment and at least one of the impingement passageways directs the flow of cooling air toward the second attachment flange of the blade track segment to cool the blade track segment.

18. The method of claim 17, wherein the intermediate mount of the carrier segment is formed to include a forward intermediate mount wall that extends radially inward from the outer wall of the carrier segment, an aft intermediate mount wall that extends radially inward from the outer wall of the carrier segment and spaced apart axially from the forward intermediate mount wall to define the cooling chamber therebetween, and an inner wall that extends axially between radially inner ends of the forward and aft intermediate mount walls.

19. The method of claim 18, wherein the inner wall is a separate piece and the method further includes brazing the inner wall to the radially inner ends of the forward and aft intermediate mount walls.

20. The method of claim 18, wherein the carrier assembly further includes a pair of end walls that are each coupled to a circumferential end of the carrier segment to close off the cooling chamber on either circumferential end of the carrier segment.

* * * * *